United States Patent [19]

Monette

[11] 4,216,378
[45] Aug. 5, 1980

[54] OPTICAL SCANNER

[75] Inventor: William A. Monette, Kettering, Ohio

[73] Assignee: The Mead Corporation, Dayton, Ohio

[21] Appl. No.: 950,253

[22] Filed: Oct. 10, 1978

[51] Int. Cl.² .............................................. G01J 1/20
[52] U.S. Cl. .................................. 250/201; 250/235
[58] Field of Search ............... 250/201, 234, 235, 236; 350/6.5, 6.91; 358/206, 293

[56] References Cited

U.S. PATENT DOCUMENTS

| | | |
|---|---|---|
| 3,389,403 | 6/1968 | Cottingham et al. |
| 3,814,494 | 6/1974 | Shiragai et al. |
| 3,997,828 | 12/1976 | Bottcher et al. |
| 4,037,231 | 7/1977 | Broyles et al. |
| 4,041,454 | 8/1977 | Shephard et al. |
| 4,060,907 | 12/1977 | Van Hook |

Primary Examiner—David C. Nelms
Assistant Examiner—Darwin R. Hostetter
Attorney, Agent, or Firm—Biebel, French & Nauman

[57] ABSTRACT

An optical scanner for scanning an image on a document to produce an electrical signal representing the image density of the image at successively scanned points positioned along a scan line on the document includes a platen for supporting the document in a scan plane. A rotatable mirror in the scanner optical system is rotated at a non-uniform angular velocity to scan the document at a controlled scan rate which may be selected as a uniform scan rate. Rotation of the mirror is controlled by means of a servo control loop responsive to a reference signal and to the output of a reference transducer which receives light from a reference grating as the mirror is rotated.

15 Claims, 2 Drawing Figures

OPTICAL SCANNER

BACKGROUND OF THE INVENTION

The present invention relates to a document scanning system, and more particularly, to a system for scanning a flat document at a constant scan rate across the document surface using a rotating mirror.

Copiers, duplicators, and other types of document processing devices require an arrangement for optically scanning an image from an original document and directing the light reflected from the image to an image processing arrangement, such as a bank of photosensitive electrical transducers, or a photoconductive drum as is commonly utilized in xerographic duplication. One technique which has been used to scan a flat document is to place the document on a moving support and transport the document past a scan station. Fixed scanning optics adjacent the scan station then scan the moving document. Such an arrangement limits the scanning rate, however, since this rate is dependent upon the rate of movement of the document past the scanning station. Additionally, the document transport may tend to be somewhat bulky.

Another approach which has in the past been commonly used is to place the document on a document supporting transparent platen and to effect scanning of the document by means of a rotating mirror which forms a part of an otherwise stationary optical scanning arrangement. It will be appreciated that if the document is held flat and, further, if the mirror is rotated at a constant angular velocity, the scanning velocity along the document will be non-uniform. In order to eliminate this non-uniformity, it has been common for scanning arrangements to use a curved transparent platen for supporting the document, with the rotating mirror positioned substantially at the center of curvature of the platen. With such an arrangement, a uniform rate of rotation of the mirror results in a uniform scanning rate across the document.

A curved document supporting platen may be somewhat undesirable, however, for a number of reasons. First, it may be necessary to scan a document which is printed upon somewhat inflexible material such that the document may not readily be deformed into the curved shape of the platen. Books having a rigid binding, for instance, may not be readily flexed. Additionally, it may be desired to scan a document which is conveyed to and from the scanning arrangement by a conveyer, such as a belt. The belt provides a substantially flat document support, and it is desirable to scan the document without removing the document from the belt.

One approach to scanning a document positioned on a flat document support is disclosed in U.S. Pat. No. 3,814,494, issued June 4, 1974, to Shiraghi et al. The device disclosed in the Shiraghi et al patent utilizes a relatively complicated camming arrangement to rotate a mirror in the scanning optics at a non-uniform angular velocity. The velocity of rotation of the mirror is varied appropriately to produce a uniform scan rate across the document. The Shiraghi et al scanning device is only as accurate, however, as the camming arrangement.

U.S. Pat. No. 3,389,403, issued June 18, 1968, to Cottingham et al, discloses a system in which a rotating mirror causes a laser beam to sweep across a flat strip of film or other light-sensitive material. A second parallel laser beam is directed by the rotating mirror to a timing bar having evenly spaced slots for receiving the beam and directing it to a photo-diode at the end of the bar. The mirror is rotated at a uniform angular velocity and thus the scanning rate across both the film and the timing bar is non-uniform. The output pulses from the photo-diode, therefore, are also non-uniform in frequency. These pulses are used to time the application of data to the laser, thus modifying the data flow sufficiently such that successive bits of data control operation of the laser as the beam strikes successive, evenly spaced scan points on the film.

U.S. Pat. No. 4,041,454, issued Aug. 9, 1977, to Shepard et al discloses scanning a document by reflecting a beam of light to the document with a rotating mirror. The beam is also split by a half slivered mirror and directed to a position reference stip having a plurality of evenly spaced markings along its entire extent. Light reflected from the document is directed to a first photosensitive transducer, while light reflected from the reference strip is directed to a second photo-sensitive transducer. The Shepard et al system scans across the document at a non-uniform scanning rate and utilizes the output pulses from the photo-transducer associated with the position reference strip to control the sampling rate of the output from the scanning transducer. This produces samples indicative of the image density of the scanned document at uniformly positioned scan points across the document, even though the document is scanned at a non-uniform rate. A similar system is shown in U.S. Pat. No. 4,037,231, issued July 19, 1977, to Broyles et al. In the Broyles device, a mirror driven by a resonant mechanical oscillator is used to scan a modulated laser beam across a rotating dielectric drum to form a charge pattern on the drum which is ultimately used in a printing process. The scan velocity of the laser beam across the drum varies sinusoidally because of the resonant nature of the drive system. The data flow which is used to modulate the laser beam is rate controlled by a variable clock to accomodate the periodic variations in scanning velocity.

U.S. Pat. No. 3,997,828, issued Dec. 14, 1976, to Bottcher et al and U.S. Pat. No. 4,060,907, issued Dec. 6, 1977, to Van Hook, both disclose scanning of documents or images on rotating drum supports in which reference marks or slots on the drum support or associated equipment provide, when scanned, reference pulses defining the position of the drum. These reference pulses are used to control the drum rotation.

Accordingly, it is seen that there is a need for a simple, reliable system for scanning a stationary, flat document at a uniform scan rate.

Summary of the Invention

An optical scanner for scanning an image on a document at successive scan points positioned along a scan line on the document includes a platen means for supporting the document in a plane. A reference grating means defines a plurality of position indicating indicia. A reference transducer means provides an electrical output signal in response to the intensity of light incident thereon. Means are provided for illuminating the image on the document and for illuminating the reference grating means. An image processor means receives light reflected from the image on the document. A scanner means, including a rotatable mirror, directs light reflected from points along the scan line on the document to the image processor means and directs light from the grating means to the reference transducer means. A reference scanning signal is applied to a comparator means which compares the output of the reference transducer means with the reference scanning signal to provide a mirror position control signal. Motor means rotate the mirror in response to the mirror position control signal, whereby the image is scanned by the image processor means at a scan rate along the scan line, which scan rate is controlled by the reference scanning signal. The reference scanning signal may be such that the scan rate is substantially uniform during scanning of the image.

The image processor means may comprise at least one scanning transducer for providing an electrical output signal in response to the intensity of light directed thereto by the rotatable mirror from the image.

Accordingly, it is an object of the present invention to provide an optical scanner in which the document to be scanned is held flat during the scanning operation; to provide such an optical scanner in which scanning is accomplished by means of a rotatable mirror; to provide such an optical scanner in which the mirror is rotated at a non-uniform rate to effect scanning along the document at a uniform rate; to provide such an optical scanner in which reference indicia are scanned simultaneously with scanning of the document; to provide such an optical scanner in which a control feedback loop is responsive to scanning of the indicia and to a reference signal to control rotation of the mirror; and to provide such an optical scanner in which the feedback loop includes a phase comparator.

Detailed Description of the Preferred Embodiments

The present invention relates to an optical scanner system and, more particularly, to a scanner which scans an image on a document to produce an electrical signal representing the image density of the image at successive scan points positioned along a scan line on the document, with scanning along the scan line being accomplished at a controlled scan rate.

Figure 1:
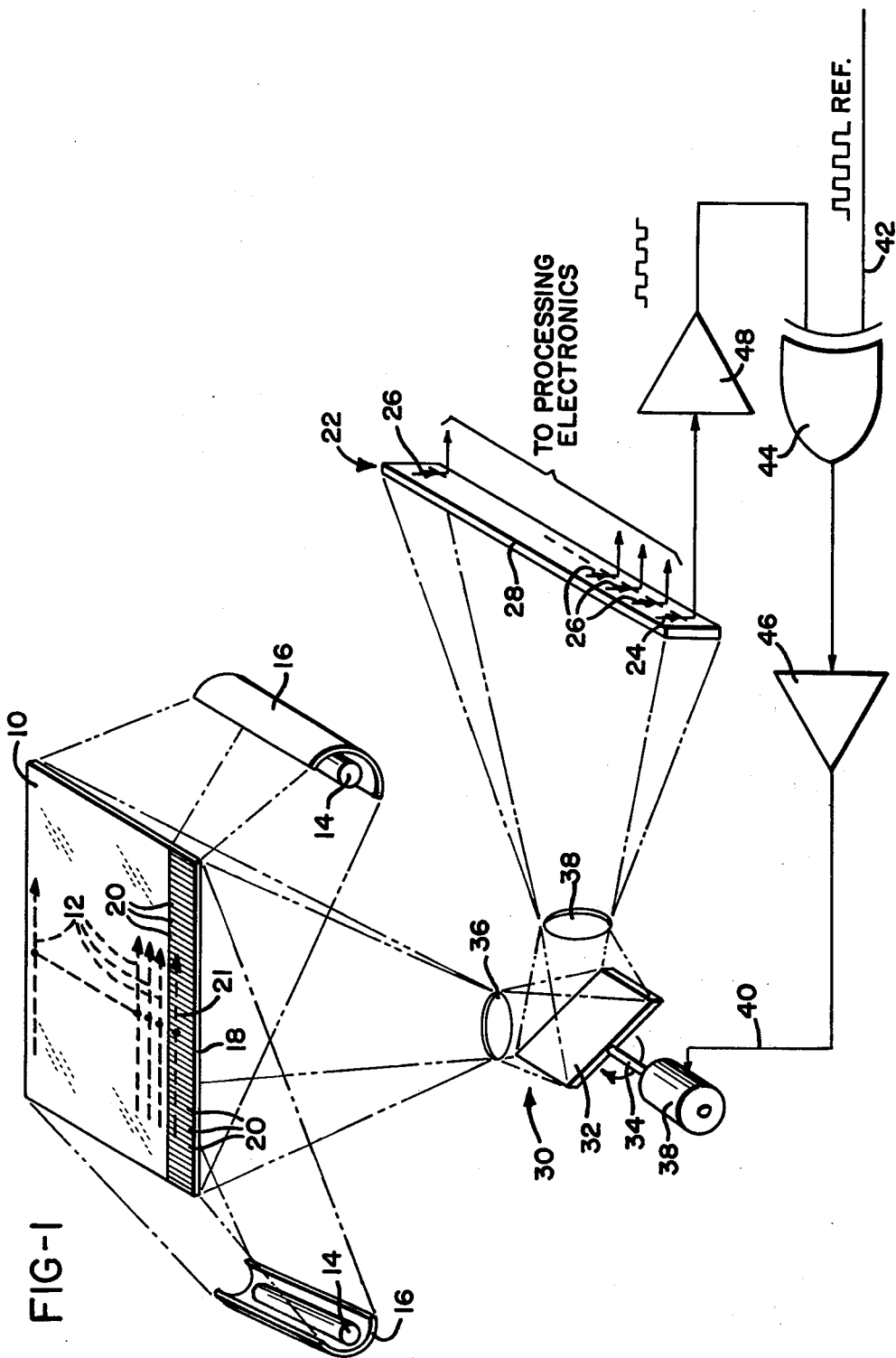
FIG. 1 is a schematic representation of the optical scanner of the present invention.

FIG. 1 illustrated schematically one embodiment of the optical scanner of the present invention. A platen means for supporting a document in a scan plane includes a transparent plate 10 which may be made of glass or any other suitable material. The document which is to be scanned at successive points positioned along scan lines 12 is placed face down on the platen 10 such that the image on the document is illuminated by lamps 14 which co-operate with silvered reflectors 16. A reference grating means 18 is positioned adjacent the platen 10 and defines a plurality of position indicating indicia 20. The indicia may comprise reference lines or markings which are positioned uniformly along the grating means in a direction parallel to the scan lines 12.

A photoelectric transducer means 22 includes a reference transducer means, such as photo-sensitive diode 24, and scanning transducer means, including photosensitive diodes 26. Each of the diodes 24 and 26 provides an electrical output signal in response to the intensity of light incident thereon. It will be appreciated that each diode will be electrically biased (not shown) in order that it may provide such an electrical output signal. It should be understood that diodes 26 will be uniformly positioned along diode support bar 28, with each such diode corresponding to one of the scan lines 12. Diodes 26 receive light reflected from the image on the document via a scanner means 30. The diodes 26 thus act as an image processing means, translating the image density on the document being scanned into electrical signals which may be applied to additional processing electronics to control a printing device, such as an ink jet printer or other facsimile printer. It will be appreciated, however, that an entirely different image processing means may be substituted for diodes 26, such as a rotating photo-conductive drum, and that such a modification would come within the scope of the present invention.

Scanner optical means 30 includes a rotatable mirror 32 which may be rotated about shaft 34. Rotation of mirror 32 causes light reflected from successive points positioned along scan lines 12 to be directed to diodes 26 via lenses 36 and 38. Similarly, rotation of mirror 32 causes light reflected from successive scan points along scan line 21 to be directed to diode 24. Output pulses from diode 24 therefore correspond in frequency to the rate at which scanning progresses along scan lines 12 on the document and on the grating 18. As discussed previously, it is highly desirable that this scanning process occur at a substantially uniform rate. Motor means, including motor 38, must therefore rotate the mirror 32 at a non-uniform angular velocity in order to accomplish scanning at such a uniform rate. Motor 38 is controlled by a mirror position control signal on line 40.

Line 42 supplies a reference scanning signal which is substantially uniform in frequency. A comparator means, including exclusive OR gate 44 and servo amplifier 46, phase compares the output of the reference diode 24 supplied through preamplifier 48, and adjusts the mirror position control signal on line 40 such that scanning of the image on the document held by platen 10 is accomplished at a substantially uniform scan rate. Although a phase comparison operation is illustrated, it will be appreciated that other types of comparators may be used to produce a mirror position control signal on line 40. When using a feedback control loop including an exclusive OR gate for phase comparison, it is desirable that the output of preamplifier 48 have a substantially 50% duty cycle. Additionally, the reference scanning signal on line 42 in such an arrangement should have a 50% duty cycle. In order to produce an output from diode 24 having a 50% duty cycle, grating 18 will consist of alternate black and white stripes of equal width.

Figure 2:
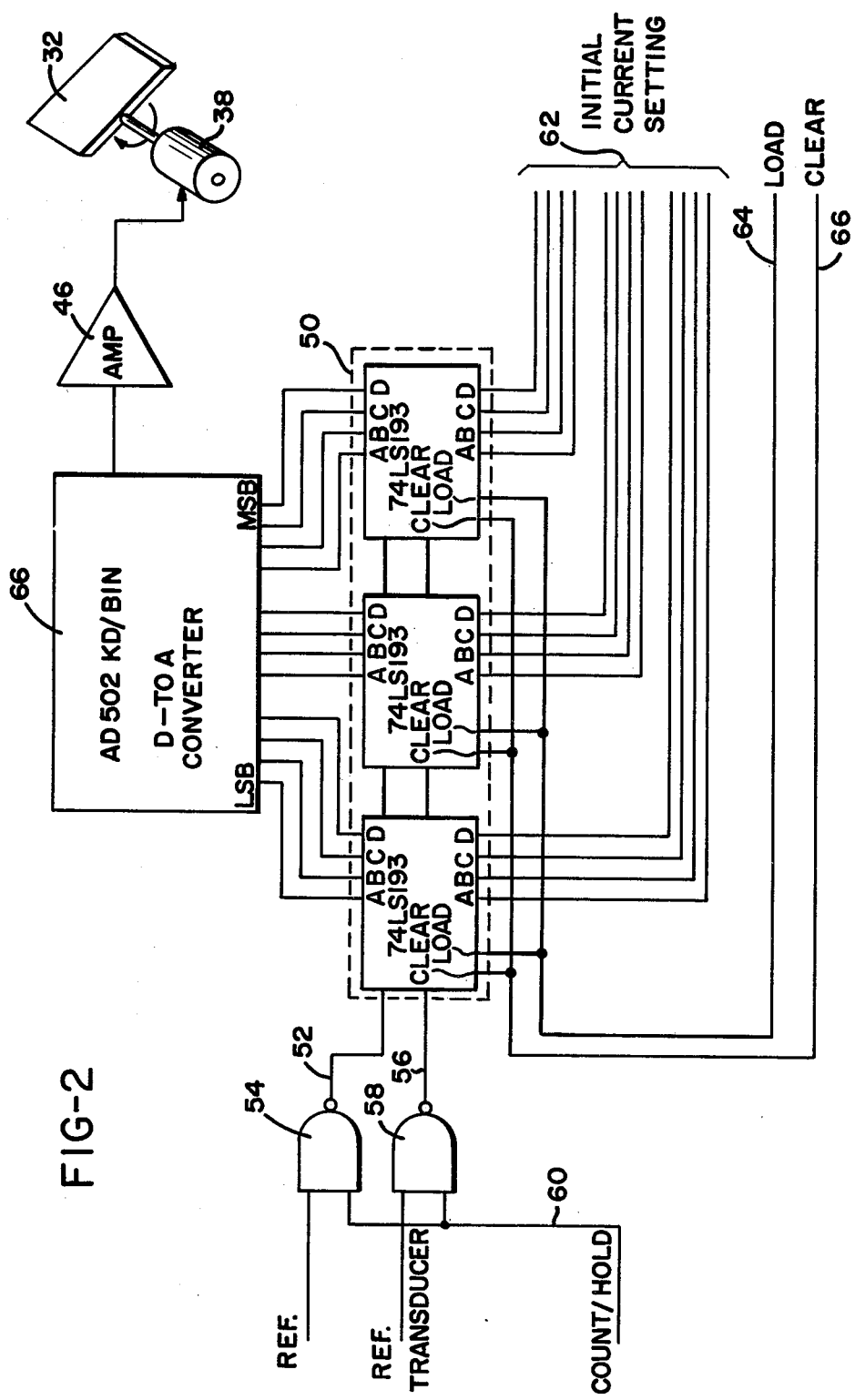
FIG. 2 is an electrical schematic of an alternative embodiment of the scan rate control circuitry.

Reference is now made to FIG. 2 which illustrates an alternative embodiment of the feedback control loop. In the embodiment of FIG. 2, the phase comparator means includes a counter means 50 which is responsive to the scanning reference signal, applied on line 52 via NAND gate 54 and to the output of the reference transducer means, applied on line 56 via NAND gate 58. When NAND gates 54 and 58 are enabled by a high signal on line 60, the counter means 50 increments its count state in a first count direction upon receipt of a reference scanning signal pulse on line 52, counter means 50 increments its count state in a second count direction upon receipt of an output pulse from the reference transducer means on line 56. Counter means 50 includes three integrated circuit components, type 74LS193, which are connected in tandem to form a 12 bit, binary counter.

Counter means 50 is initially loaded with a nominal count, such as 100000000000 by applying the count to lines 62 and energizing line 64. This may be accomplished by conventional switching circuitry or, if desired, by a micro-processor. The count state in counter means 50 corresponds to the current which is to be applied to motor 38 via servo amplifier 46. Accordingly, a digital-to-analog converter 66 is responsive to the count state of counter means 50 and provides an analog output which is related to this count state.

After the counter means 50 is loaded, receipt of a reference scanning signal pulse on line 52 causes the count in counter means 52 to increase, thereby increasing the current which is applied to the motor 38 with the result that rotation of the mirror 32 will be accelerated. Similarly, receipt of a pulse on line 56 from the reference transducer means will cause the count state of the counter means 50 to be decremented, reducing the current supplied to the motor 38 and thereby slowing the rotational velocity of the mirror 32. When the servo control loop is precisely phase locked, the pulses will be applied to the counter means 50 simultaneously on lines 52 and 56, with the result that the count state of counter means 50 does not change.

At the end of a scanning operation, if it is desired to return the mirror 32 to its initial scanning position, a count may be loaded into counter means 50, such as a binary number less than 10000000000 (indicating a negative current value). The direction of motor rotation is therefore reversed and, if desired, a higher frequency reference pulse may be applied to the servo loop in order to rotate the mirror 32 rapidly back to its initial scanning position. The count in counter means 50 is then cleared by the application of a signal to line 66 and a count loaded into counter means 50 suitable for the next succeeding scanning operation.

It should be appreciated that a comparator system other than the phase locked comparators illustrated in FIG. 1 and in FIG. 2 may be utilized in a feedback servo control arrangement constructed in accordance with the present invention. For example, lines 52 and 54 in FIG. 2 may each be connected to a separate binary counter. The count state of these binary counters would therefore indicate the position of the scan points being scanned and the desired position of the scan points to be scanned. A comparison of count states in the two counters could be made, as for instance by means of a standard binary subtractor circuit, and the difference in count states applied via a digital-to-analog converter to a servo control current amplifier for controlling rotation of the motor 38. Such a comparator arrangement, in essence, compares desired scanning position against actual scanning position and adjusts the motor control current accordingly. The embodiments of FIGS. 1 and 2, on the other hand, compare actual scanning velocity against desired scanning velocity to produce the mirror position control signal. In either case, rotation of the scanning mirror is accomplished at a rate such that uniform scanning of the document will result.

In some situations it may be desirable to scan a document image at a non-uniform rate. The electrical signals produced by the scanning transducers may be used, for instance, to control operation of an ink jet printer or other printing device which is printing at a non-uniform rate. A non-uniform reference scanning signal may be generated by the printer control logic such that scanning by the optical scanner of the present invention occurs at a rate which is synchronized with the rate of printer operation.

While the forms of apparatus herein described constitute preferred embodiments of the invention, it is to be understood that the invention is not limited to these precise forms of apparatus, and that changes may be made therein without departing from the scope of the invention.

What is claimed is:

1. An optical scanner for scanning an image on a document to produce an electrical signal representing the image density of the image at successively scanned points positioned along a scan line on the document, comprising:
   platen means for supporting a document,
   reference grating means positioned adjacent said platen means and defining a plurality of position indicating indicia thereon,
   photoelectric transducer means including reference transducer means and a scanning transducer means, each of said transducer means providing an electric output signal in response to the intensity of light incident thereon,
   means for illuminating said image on said document and said reference grating means,
   scanner optical means, including a rotatable mirror, for directing light reflected from points positioned along scan lines on said grating means and said image to said reference transducer means and said scanning transducer means, respectively, as said mirror is rotated,
   means for supplying a reference scanning signal,
   comparator means for comparing the output of said reference transducer means with said reference scanning signal to provide a mirror position control signal, and
   motor means for rotating said mirror in response to said mirror position control signal,
   whereby said image is scanned by said scanning transducer means at a scan rate along said scan line, which scan rate is controlled by said reference scanning signal.

2. The scanner of claim 1 in which said reference scanning signal is such that said scan rate is substantially uniform during scanning of said image.

3. The scanner of claim 1 in which said reference grating means is positioned in said scan plane and in which said position indicating indicia comprise reference lines positioned uniformly along said grating means in a direction parallel to said scan lines.

4. The scanner of claim 1 in which said comparator means comprises phase comparator means for determining the phase relationship between the output of said reference transducer means and said reference scanning signal, and for providing said mirror position control signal in response thereto.

5. The scanner of claim 4 in which said scanning reference signal and said output of said reference transducer means each comprise 50% duty cycle signals and, further, said phase comparator means includes an exclusive OR gate.

6. The scanner of claim 4 in which said reference scanning signal and said output of said reference transducer means each comprise pulse train signals, and in which said phase comparator means comprises counter means, responsive to said scanning reference scanning signal and to said output of said reference transducer means, for assuming a count state corresponding to the mirror position control signal which is to be applied to said motor means, said counter means incrementing its count state in a first count direction upon receipt of a reference scanning signal pulse and incrementing its count state in a second count direction upon receipt of an output pulse from said reference transducer means.

7. The scanner of claim 6 further comprising a digital-to-analog converter responsive to said counter means and providing an analog output related to the count state of said counter means.

8. The scanner of claim 7 further comprising a current amplifier responsive to said digital-to-analog output for applying a mirror position control signal to said motor means.

9. The scanner of claim 1 in which said scanning transducer means comprises a plurality of scanning transducers positioned to receive light reflected from points along a plurality of parallel scan lines on said document as said rotatable mirror is rotated by said motor means, thereby providing a plurality of electrical output signals.

10. A method of scanning a document to produce an electrical signal corresponding to the image density of an image on the document at successively scanned points positioned along scan line, comparising the steps of:
positioning a document in a scan plane,
positioning a grating having spaced markings thereon in fixed spatial relationship to said document,
directing light reflected from said document and said grating to photoelectric transducers by means of a mirror,
detecting the light reflected from said grating and providing an electrical signal in correspondence thereto,
providing a reference scanning signal, and
rotating said mirror at a rate dependent upon the difference between said reference scanning signal and said output corresponding to said light reflected from said grating.

11. An optical scanner for scanning an image on a document at successive scan points positioned along a scan line on the document, comprising:
platen means for supporting the document,
reference grating means defining a plurality of position indicating indicia thereon,
reference transducer means providing an electrical output signal in response to the intensity of light incident thereon,
means for illuminating said image on said document and for illuminating said reference grating means,
image processor means for receiving light reflected from said image on said document,
scanner means, including a rotatable mirror, for directing light reflected form points along said scan line on said document to said image processor means and for directing light from said grating means to said reference transducer means,
means for supplying a reference scanning signal,
comparator means for comparing the output of said reference transducer means with said reference scanning signal to provide a mirror position control signal, and
motor means for rotating said mirror in response to said mirror position control signal, whereby said image is scanned by said image processor means at a scan rate along said scan line, which scan rate is controlled by said reference scanning signal.

12. The optical scanner of claim 11 in which said image processor means comprises at least one scanning transducer which provides an electrical output signal in response to the intensity of light directed thereto from said image by said rotatable mirror.

13. The optical scanner of claim 11 in which said reference scanning signal is such that said scan rate is substantially uniform during scanning of said image.

14. The optical scanner of claim 13 in which said platen means comprises means for supporting the document in a plane.

15. The method of scanning a document to produce an electrical signal corresponding to the image density of an image on the document at successively scanned points positioned along a scan line, comprising the steps of:
positioning the document in a scan plane,
rotating a mirror such that light reflected from the document at successive scan points along the scan line is directed to a photoelectric transducer,
photoelectrically sensing the rate at which successive points along said scan line are scanned, and
adjusting the rate of rotation of said mirror such that said successive points along said scan line are scanned at a constant scanning rate.

* * * * *

UNITED STATES PATENT AND TRADEMARK OFFICE
CERTIFICATE OF CORRECTION

PATENT NO. : 4,216,378

DATED : August 5, 1980

INVENTOR(S) : William A. Monette

It is certified that error appears in the above-identified patent and that said Letters Patent are hereby corrected as shown below:

Column 2, line 14, "slivered" should be --silvered--.

Column 3, line 46, "illustrated" should be --illustrates--.

Column 8, line 9, "form" should be --from--.

Signed and Sealed this

Eleventh Day of November 1980

[SEAL]

Attest:

SIDNEY A. DIAMOND

Attesting Officer  Commissioner of Patents and Trademarks